(12) United States Patent  
McCall et al.

(10) Patent No.: US 9,623,784 B1  
(45) Date of Patent: Apr. 18, 2017

(54) MOTORCYCLE TIE-DOWN APPARATUS

(71) Applicant: B & W Custom Truck Beds, Inc., Humboldt, KS (US)

(72) Inventors: Travis M. McCall, Humboldt, KS (US); Joseph W. Works, Humboldt, KS (US); Cody Rietcheck, Manhattan, KS (US)

(73) Assignee: B & W CUSTOM TRUCK BEDS, INC., Humboldt, KS (US)

( * ) Notice: Subject to any disclaimer, the term of this patent is extended or adjusted under 35 U.S.C. 154(b) by 0 days.

(21) Appl. No.: 15/057,893

(22) Filed: Mar. 1, 2016

(51) Int. Cl.  
*B60P 3/079* (2006.01)  
*B60P 3/073* (2006.01)

(52) U.S. Cl.  
CPC ............. *B60P 3/079* (2013.01); *B60P 3/073* (2013.01)

(58) Field of Classification Search  
CPC ................................ B60P 3/079; B60P 3/073  
USPC .......... 410/2, 3, 7–9, 17, 19, 22, 30, 77, 80; 224/403, 501, 510, 536, 323, 552, 42.38, 224/554, 570, 924; 248/503  
See application file for complete search history.

(56) References Cited

U.S. PATENT DOCUMENTS

| | | | |
|---|---|---|---|
| 6,109,494 A | 8/2000 | Pilmore | |
| 6,902,363 B2 | 6/2005 | Couto | |
| 6,966,732 B2 | 11/2005 | Gohata | |
| 7,108,466 B2 | 9/2006 | Panzarella et al. | |
| 7,232,281 B2 | 6/2007 | Fullenkamp | |
| 7,287,942 B1 | 10/2007 | Valkenburgh | |
| 7,347,653 B1 | 3/2008 | Roberts | |
| 7,896,592 B1 * | 3/2011 | Winchel .................. | B60P 3/073 410/3 |
| 8,348,561 B1 | 1/2013 | Bauer, Sr. | |
| 2012/0321407 A1 | 12/2012 | Lindsey et al. | |

* cited by examiner

*Primary Examiner* — Stephen Gordon  
(74) *Attorney, Agent, or Firm* — Erickson Kernell IP, LLC

(57) ABSTRACT

A motorcycle tie-down apparatus for securing a motorcycle for transport. The apparatus includes a base secured to a transport vehicle and a clamp that is clamped to lower frame members of the motorcycle. The clamp includes a telescoping tubular structure and extends outwardly beyond sides of the motorcycle. The base includes a pair of latches with slots that translationally receive respective end portions of the clamp. The slots extend downward to compress the suspension of the motorcycle during engagement of the clamp with the base. Latch plates pivot to capture the clamp in the slots and locking levers and release levers selectively restrict pivoting of the latch plate and thus withdrawal of the clamp from the slot. The locking levers and release levers employ a dual-motion action from a user to release the clamp from the latch plate.

20 Claims, 8 Drawing Sheets

MOTORCYCLE TIE-DOWN APPARATUS

BACKGROUND

Many devices are present in the art for securing a motorcycle during transport and storage. For example, flexible tie down straps have been used for many years. Typically, such straps require attachment to a motorcycle at four locations. The common practice with the straps is to compress the suspension at one end of the motorcycle, secure a strap on either side of the motorcycle, then repeat the process at the other end of the motorcycle. The ends of the straps opposite those attached to the motorcycle must be secured to some part of the object to which the motorcycle is temporarily attached. The drawbacks to such straps are numerous, including the tendency to loosen during transport, difficulty in locating a proper securing point on the motorcycle itself, difficulties in locating proximal securing points for the ends of the straps opposite those attached to the motorcycle, and, often, undesirable compression of or stress on the motorcycle's suspension.

Other devices exist which are firmly secured to various parts of a motorcycle, such as to the handlebars or the forks. Many devices temporarily engage either side of a tire or wheel in a track-like arrangement. All of these devices have shortcomings. Shortcomings include potential marring of the motorcycle, rubbing of tires and wheels, and cumbersome and space-consuming designs. Additionally, releasing the motorcycle is often quite difficult, and without assistance, the motorcycle may fall over.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a motorcycle tie-down apparatus that secures a motorcycle while in transit.

The motorcycle tie-down apparatus comprises a clamp and base assembly. The base assembly is secured to the vehicle and the clamp is removably connectable to the base assembly. The clamp removably fastens to the lower frame members of a motorcycle. The clamp includes a pair of telescoping tubes with a threaded rod disposed to extend coaxially. The threaded rod is rotatable via a handle to limit the telescopic travel of the tubes.

A clamp arm is disposed on the exterior of each of the tubes in opposing relation to one another. The clamp arms are engageable with the frame of a motorcycle or other recreational vehicle and are retained in engagement therewith by turning the threaded rod to tighten the clamps against the frame.

A guide is provided between the tubes to guide their telescopic movements and to restrict relative rotational movements about their central axis. The guide includes an eye flange disposed on one of the tubes and a guide rod disposed on the other of the tubes. The guide rod extends parallel to the tubes and slideably engages an aperture in the eye flange.

The base assembly includes a base plate that is secured to a surface, such as a trailer floor, truck bed, or garage floor. A pair of upstanding mounting brackets are affixed to the base plate adjacent opposite ends thereof. A latching mechanism is coupled to each of the mounting brackets.

Each latching mechanism includes a slot plate on which a latch plate, a release lever, and a locking lever are pivotally mounted. The slot plate includes a slot extending into the body thereof that has dimensions configured to receive a respective tube of the clamp therein. The slot trails downwardly toward the base plate which aids in drawing the frame of the motorcycle downward when engaging the clamp with the base assembly. Such downward movement at least partially compresses the suspension of the motorcycle which in turn applies a return force against the motorcycle tie-down apparatus that aids to more securely restrain the motorcycle thereon.

The slot plate is coupled to a respective mounting bracket of the base plate using one or more fasteners disposed through both the slot plate and the mounting bracket. Apertures in the slot plate are provided with a stacked, double-diamond configuration which provides additional vertical adjustability to the mounted position of the slot plate relative to the mounting bracket. The additional adjustability provides better adaptability of the motorcycle tie-down apparatus to a variety of motorcycle dimensions.

The latch plate pivots to obstruct removal of the clamp from the slot. The release lever is pivotable to restrict pivotal motion of the latch plate. And the locking lever is pivotable to obstruct pivotal motion of the release lever. The configuration of the locking lever and the release lever require a multi-movement or dual-pivoting operation by a user to enable the clamp assembly to be disengaged from the locking mechanism thereby preventing inadvertent release of the locking mechanism.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With reference now to the drawings a motorcycle tie-down apparatus 10 is described in accordance with an embodiment of the invention. The apparatus 10 comprises a clamp 12 that is removably securable to the frame of a motorcycle and a base assembly 14 that can be fixedly disposed on a surface of a transport vehicle or trailer. Embodiments of the invention are described herein with reference to a motorcycle, however such is not intended to so limit embodiments of the invention. For example, the apparatus 10 may be employed to tie down or secure other motorized vehicles such as all-terrain vehicles, mopeds, dirt bikes, or similar street-legal and off-road vehicles having two, three, or four wheels. Preferably, the vehicle to be secured includes a pair of frame members extending longitudinally along the length of the vehicle near a bottom edge or surface thereof and that are exposed to or engageable by the clamp 12 along opposing lateral sides of the motorcycle as described below. But the clamp 12 can be engaged with other features of the vehicle without departing from the scope of embodiments described herein.

The frame members may comprise bottom rails of a motorcycle frame that extend rearward from a downtube of the frame or similar corresponding structures of other similar vehicles. Typically, the frame members are comprised of tubes having a circular cross-section, but other shapes or types of frame members may be employed.

The transport vehicle can comprise a vehicle or trailer, such as a pick-up truck, flat-bed trailer, or other vehicle or trailer having a substantially flat or planar load surface sufficient to support the motorcycle to be transported thereon. The transport vehicle may include ramps or other apparatus to aid movement of the motorcycle onto the load surface from the ground.

Figure 1:
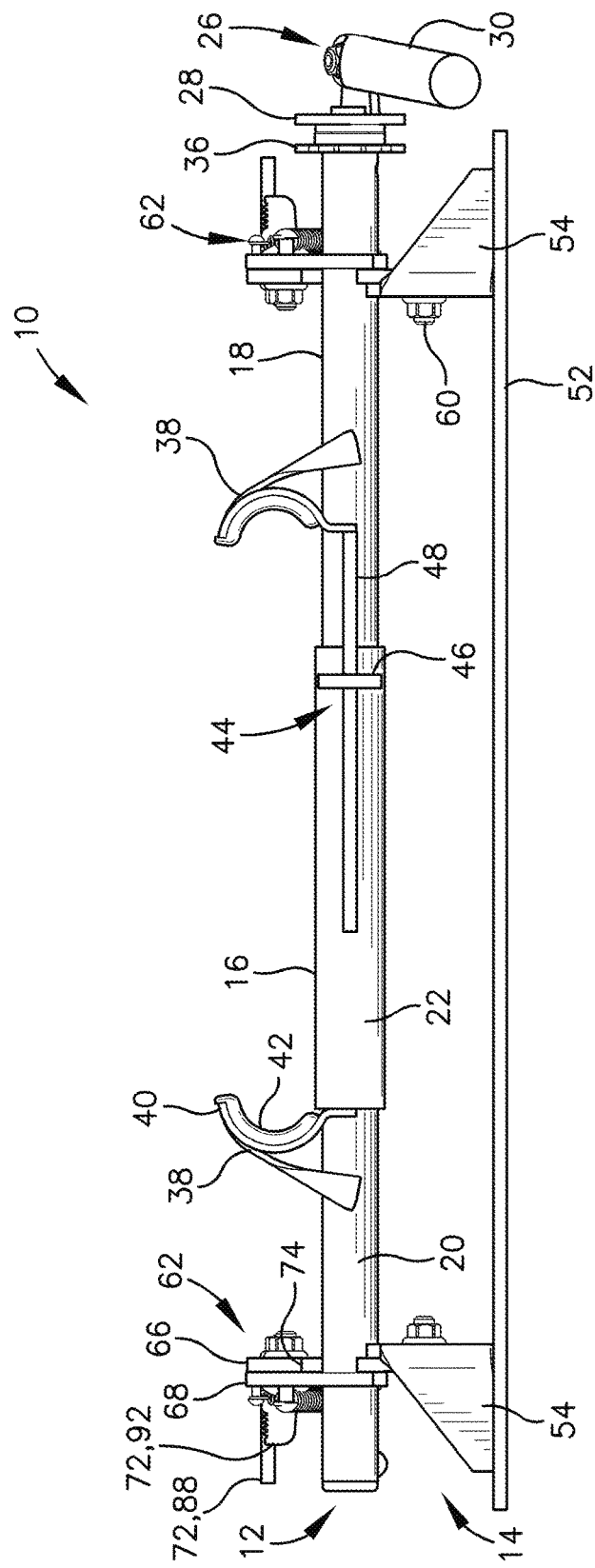
FIG. 1 is an elevational front view of a motorcycle tie-down apparatus depicted in accordance with an embodiment of the invention.
Figure 2:
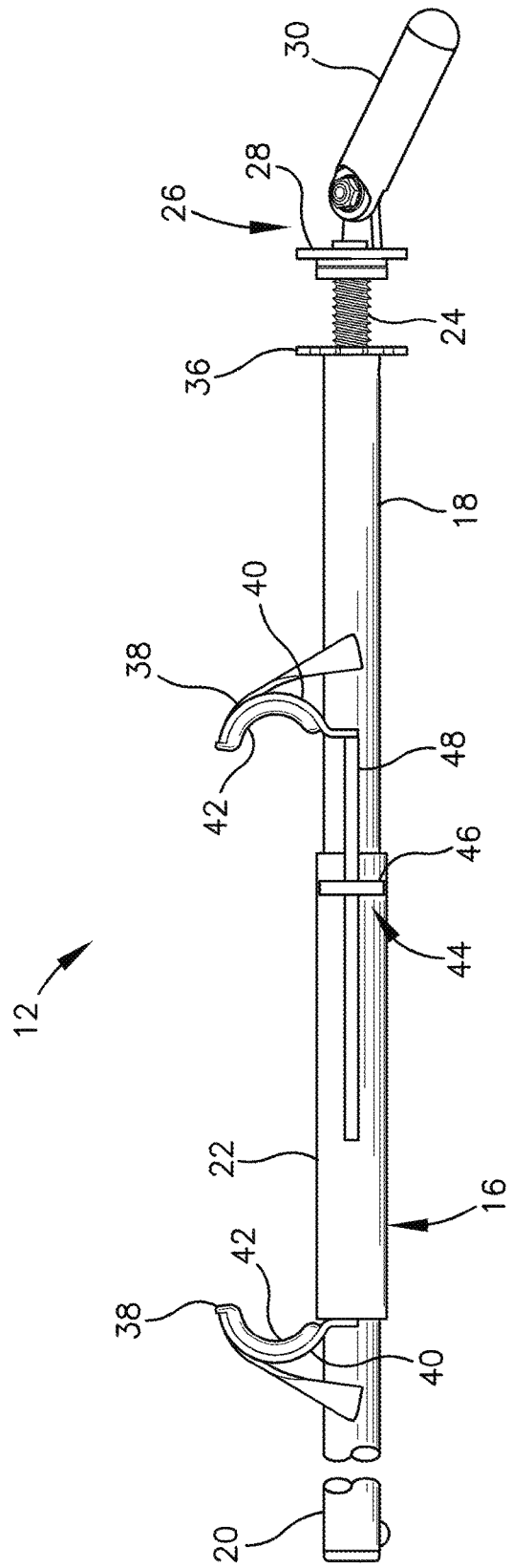
FIG. 2 is an elevational front view of a clamp of the motorcycle tie-down apparatus of FIG. 1.
Figure 3:
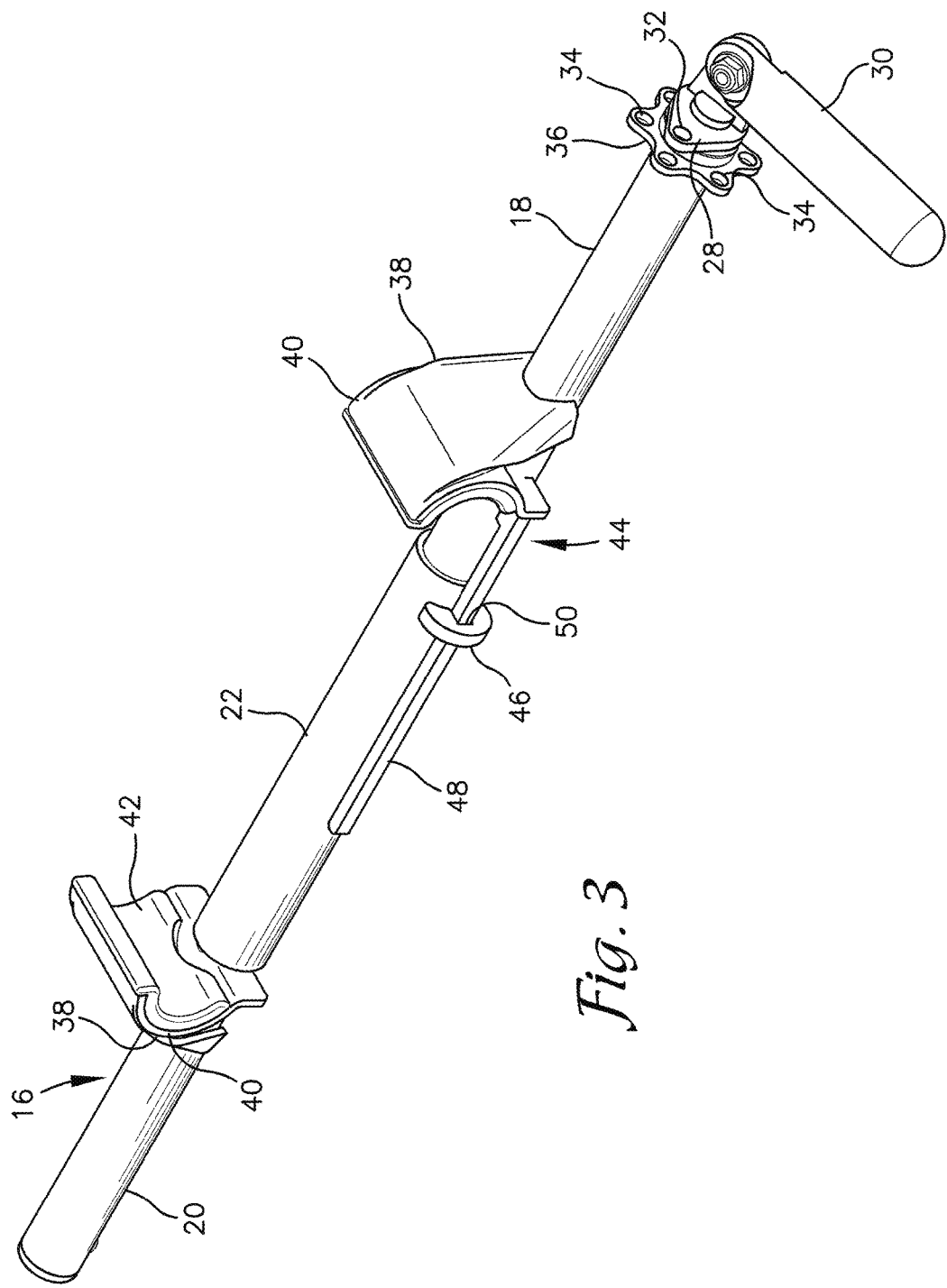
FIG. 3 is a perspective top view of the clamp of FIG. 2.

Referring now to FIGS. 1-3, the clamp 12 comprises a receiving tube 16 and a nested tube 18. The receiving tube 16 includes an end portion 20 and a receiver 22. The end portion 20 and the nested tube 18 each have a hollow interior and similar outer diametrical dimensions. The receiver 22 extends from one end of the end portion 20 toward the nested tube 18 and includes an inner diameter that is sufficient to receive the nested tube 18 therein in a slideable or telescopic relation.

A threaded rod 24 is disposed coaxially within the nested tube 18 and the receiving tube 16. A threaded coupling (not shown) is disposed at a location interior to the receiving tube 16 at a position preferably along the length of the end portion 20 or at or near the junction between the end portion 20 and the receiver 22. One end of the threaded rod 24 threadably engages the threaded coupling and an opposite end of the threaded rod 24 fixedly and non-rotatably couples with a handle assembly 26. The nested tube 18 is thus captured between the engagement of the threaded rod 24 with the threaded receiver in the receiving tube 16 and the handle assembly 26. Rotation of the handle assembly 26 about the longitudinal axis of the threaded rod 24 operates to move the handle assembly 26 toward or away from the receiving tube 16 and thus to move the nested tube 18 further into the receiver 22 or to allow withdrawal therefrom.

The handle assembly 26 includes a securement flange 28 that extends radially outward from the threaded rod 24 in one or more radial directions and a pivotable handle 30. As best seen in FIG. 3, the securement flange 28 includes one or more bores 32 therethrough that extend parallel to the threaded rod 24. The bores 32 are configured to be selectively aligned with bores 34 in a second securement flange 36 extending radially outward from an adjacent end of the nested tube 18. Alignment of the bores 32 with the bores 34 enables insertion of a locking pin, pad lock, strap, or the like through both bores 32 and 34 to prevent rotation of the handle assembly 26 relative to the nested tube 18.

The handle 30 is pivotably mounted at a distal end of the handle assembly 26 to enable the handle 30 to pivot relative to the longitudinal axis of the threaded rod 24, or to the clamp 12 generally. The handle 30 is depicted in FIGS. 1-3 as comprising a rod or cylindrical body, but can take any desired form without departing from the scope of embodiments described herein. Surface features, such as knurling, ribs, protuberances, ridges, coatings, or the like can be added to the surface of the handle 30 to aid gripping by a user or to enhance aesthetics.

A pair of clamp arms 38 are disposed on the exterior of the receiving tube 16 and the nested tube 18 in opposing orientations with one clamp arm 38 on each tube 16, 18. The clamp arms 38 include a curved portion 40 that is sized and formed to receive at least a portion of a frame member of the motorcycle therein in a substantially form fitting manner. A pad 42, such as a section of a rubber, foam, plastic, or similar material configured to reduce or prevent damage to the frame tube may be provided on an inner surface of the curved portion 40 to prevent direct contact between the curved portion 40 and the frame tube. As depicted in FIGS. 1-3, the opposing orientations of the clamp arms 38 direct the inner surfaces of the curved portions 40 toward one another to capture frame members of the motorcycle therebetween as described more fully below. In another embodiment, the curved portions 40 may be directed away from one another to capture the frame members along respective inward-facing surfaces thereof.

A guide 44 may be provided on the exterior of the clamp 12 to prevent rotational movement of the receiving tube 16 relative to the nested tube 18. The guide 44 includes an eye-flange 46 disposed on the exterior surface of the receiving tube 16 and a guide rod 48 coupled to the exterior surface of the nested tube 18. The eye flange 46 includes a bore or eye 50 extending therethrough and longitudinally aligned with the receiving tube 16. The guide rod 48 comprises an elongate rod that is aligned parallel to the nested tube 18 and is spaced apart from the surface of the nested tube 18 a distance sufficient to allow the wall of the receiving tube 16 to pass between the guide rod 48 and the nested tube 18. The guide rod 48 is fixedly coupled at a first end to the nested tube 18 and extends toward and overlaps with the receiving tube 16 to slideably engage the eye 50. Engagement of the guide rod 48 with the eye-flange 46 thus allows longitudinal movements between the receiving tube 16 and the nested tube 18 but prevents relative rotation therebetween.

In operation, the clamp 12 is installed on the motorcycle by rotating the threaded rod 24 in a first direction, e.g. counter-clockwise, to allow the clamp arms 38 to be moved away from one another a distance sufficient to receive the frame members of the motorcycle therebetween. The frame members of the motorcycle preferably comprise tubes that extend along or near a bottom surface of the motorcycle in a generally longitudinal direction relative to the length of the motorcycle. The frame tubes generally lie near outer edges of the motorcycle and are exposed for engagement by the clamp arms 38. The clamp 12 is disposed beneath and perpendicular to the length of the motorcycle and is brought upward to place the clamp arms 38 alongside the frame tubes. The clamp arms 38 can then be moved toward one another to engage the frame tubes therebetween. The clamp arms 38 can be moved manually or by rotating the threaded rod 24 in an opposite second direction, e.g. clockwise. The threaded rod 24 is further rotated in the second direction to apply a force between the clamp arms 38 and the frame members that is sufficient to retain the engagement under stresses applied during transport of the motorcycle. The handle 30 may be pivoted to enable greater mechanical advantage for rotating the threaded rod 24 and/or to avoid the handle 30 from obstructing the rotation, such as by contacting the ground or loading surface. A pin, lock, or similar device may be installed through the bores 32 and 34 in the securement flange 28 and the second securement flange 36, respectively, to prevent inadvertent or intentional removal of the clamp 12 from the motorcycle by preventing the threaded rod 24 from being rotated in the first direction. Removal of the clamp 12 from the motorcycle is completed by simply rotating the handle 30 and threaded rod 24 in the first direction to allow the clamp arms 38 to move apart and free the frame members.

The clamp 12 is configured to quickly and removably couple to the motorcycle such that the clamp 12 can be installed just prior to transportation of the motorcycle on the transport vehicle and removed after reaching the destination. The clamp 12 can be installed prior to or after loading/unloading the motorcycle onto the load bed of the transport vehicle. It is preferable to remove the clamp 12 from the motorcycle prior to driving the motorcycle so as to avoid interference of the clamp 12 with the rider and/or contact of the clamp 12 with the ground or other obstacle.

Figure 8:
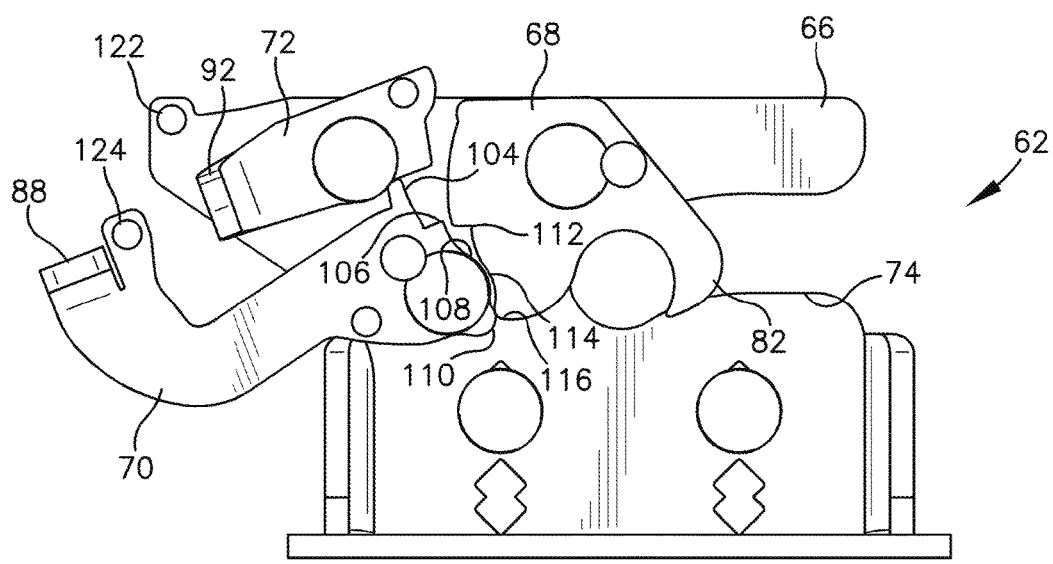
FIG. 8 is an outer side elevational view of the locking mechanism of FIG. 6 in a unlatched orientation and depicted with a pair of coil springs removed for clarity.
Figure 9:
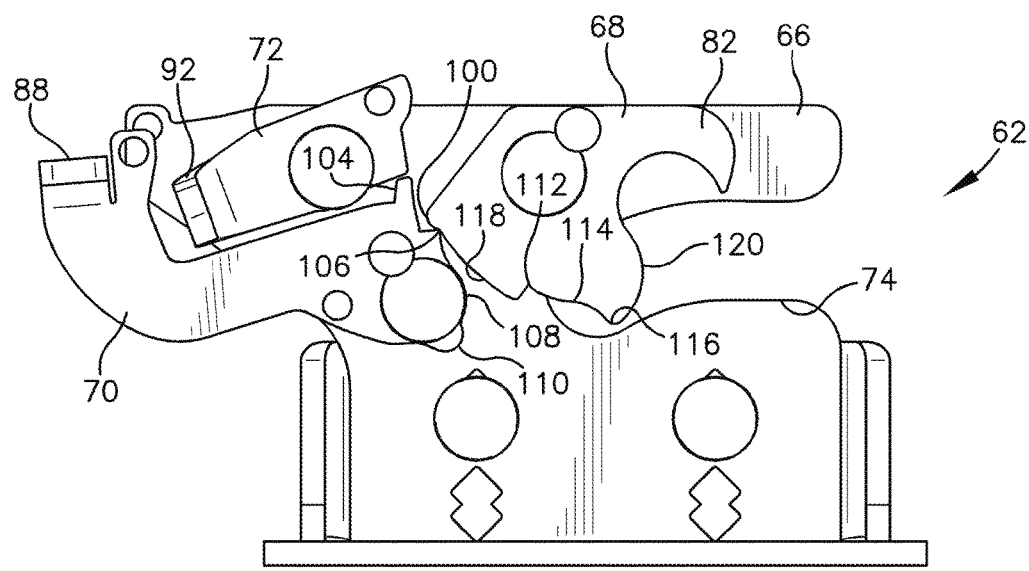
FIG. 9 is an outer side elevational view of the locking mechanism of FIG. 6 in a released or armed orientation and depicted with a pair of coil springs removed for clarity.
Figure 10:
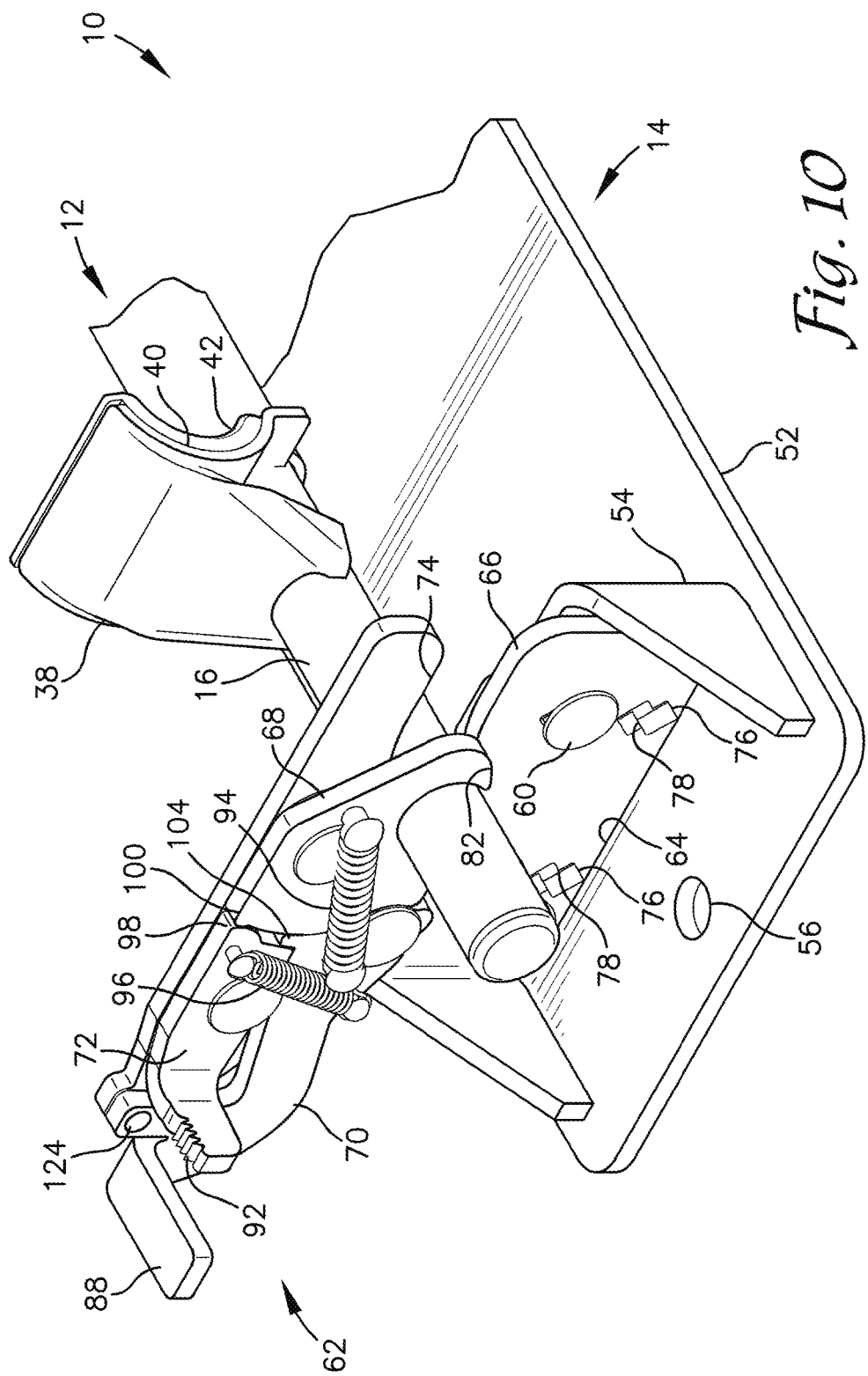
FIG. 10 is an enlarged partial perspective view of the motorcycle tie-down apparatus of FIG. 1.
Figure 11:
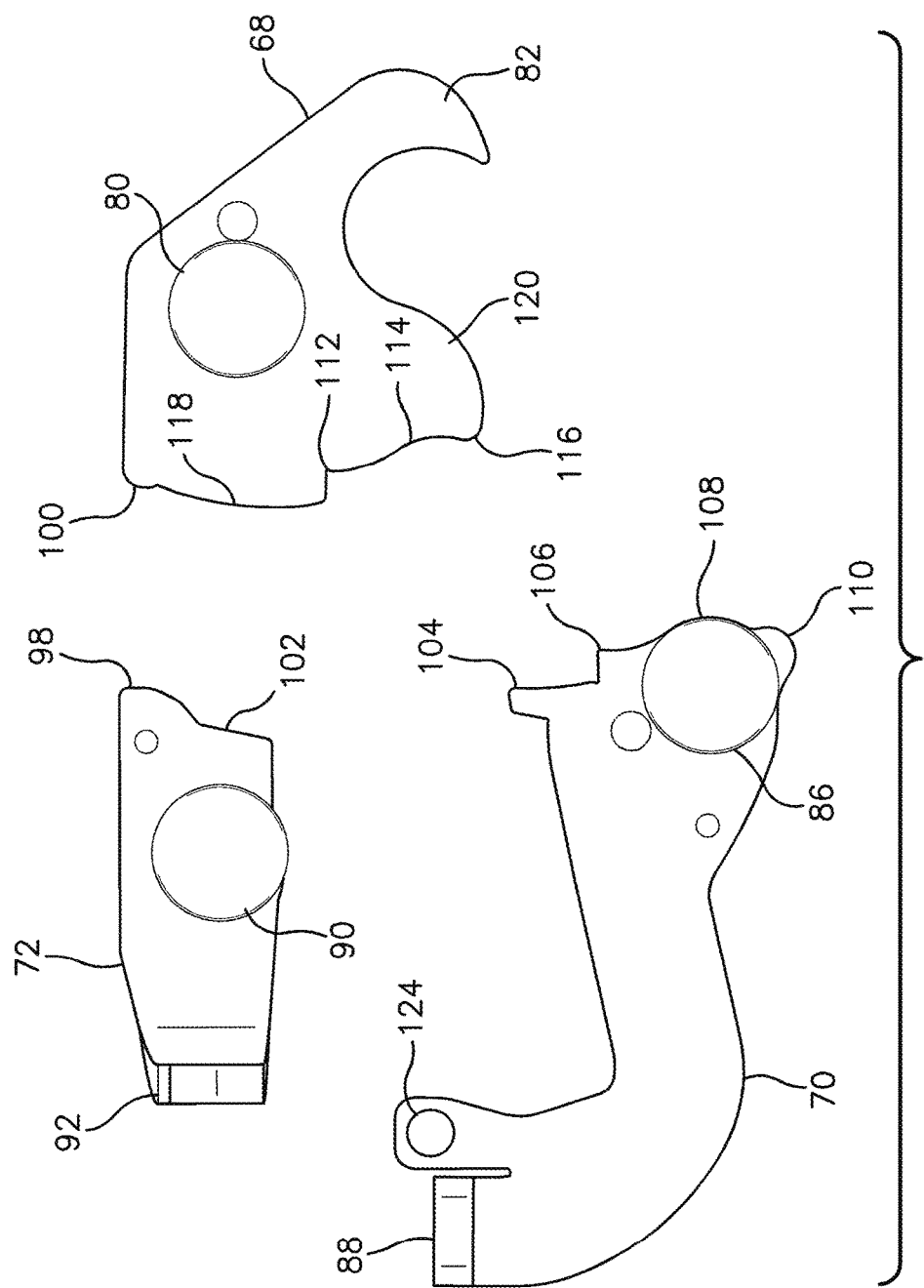
FIG. 11 is a partial exploded elevational view of a latch plate, a release lever, and a locking lever of the motorcycle tie-down apparatus of FIG. 1.

With additional reference now to FIGS. 4-10, the base assembly 14 is described in accordance with an embodiment of the invention. The base assembly 14 comprises an elongate base plate 52 with a mounting bracket 54 disposed near each end thereof. The base plate 52 includes a plurality of features, such as bores 56 therethrough for fixedly mounting the base plate 52 to the loading surface of the transport vehicle such as by bolts or other fasteners. The mounting brackets 54 stand upright on the base plate 52 and extend across the width thereof. The mounting brackets 54 include a plurality of bores 58 through which fasteners 60 can be inserted for coupling to a latch assembly 62 as described below. As best seen in FIG. 10, a slot 64 may be provided in the base plate 52 alongside the mounting bracket 54 and sized to receive a lower extremity of a slot plate 66 of the latch assembly 62 to aid vertical adjustability of the latch assembly 62 relative to the base plate 52 as described below.

The latch assembly 62 is now described with respect to FIGS. 6-10. Directional terms including forward, rearward, clockwise, counter-clockwise, and the like are used hereinafter to describe the relative positions and movements of components of the apparatus 10, wherein forward or front refers to the left-hand side of the drawings as depicted in FIGS. 6-10 and rearward or rear refers to the right-hand side. Clockwise and counter-clockwise are used relative to the components as depicted in FIGS. 6-10. Such is for simplicity in explanation and not to indicate a particular arrangement or orientation of the apparatus 10 in use or operation.

Figure 4:
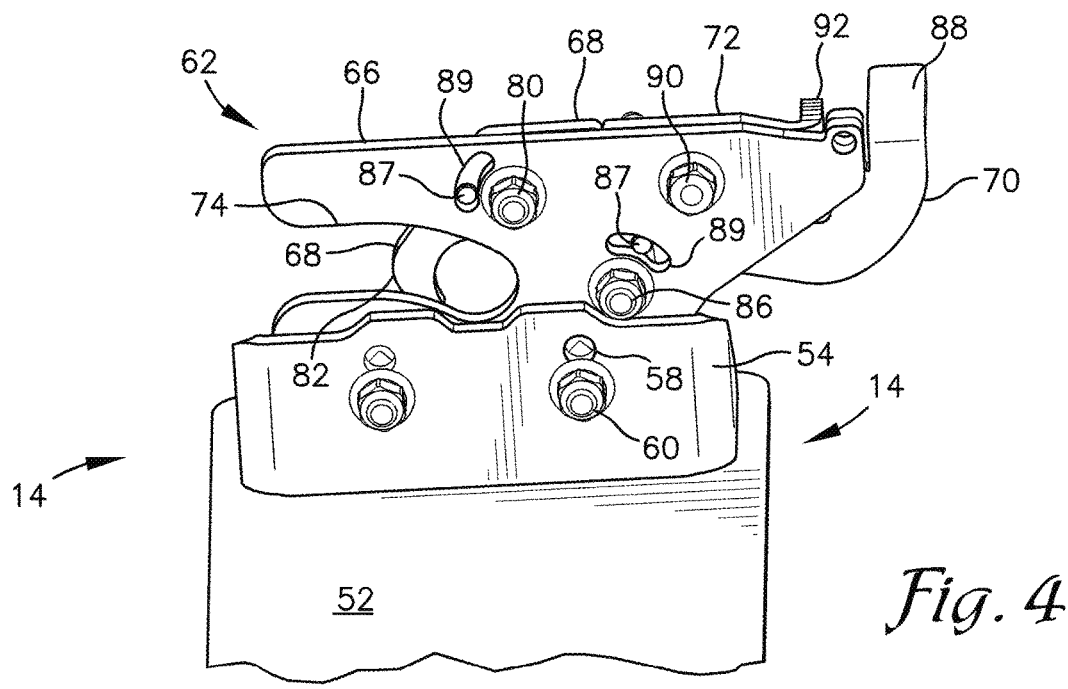
FIG. 4 is a perspective inner side view of a mounting bracket and locking mechanism of the motorcycle tie-down apparatus of FIG. 1.
Figure 5:
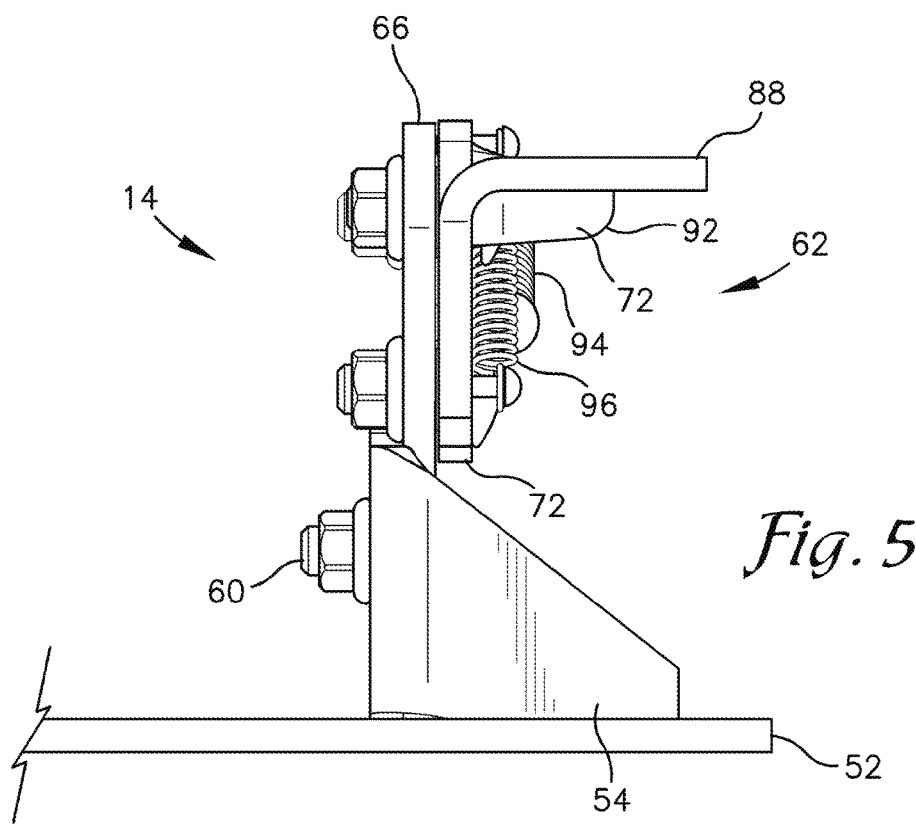
FIG. 5 is an elevational rear end view of the mounting bracket and locking mechanism of FIG. 4.

The latch assembly 62 comprises the slot plate 66, a latch plate 68, a release lever 70, and a locking lever 72. The slot plate 66 comprises a generally rectangular plate that forms the body of the latch assembly 62. A slot 74 extends forward into the body of the slot plate 66 from a rear edge thereof. As shown in FIG. 4, the slot 74 is generally horizontally oriented near the rear edge of the slot plate 66 but then turns or trails downward toward the base plate 52 as the slot 74 extends forward into the slot plate 66. The width of the slot 74 is larger than the outer diameter of the end portion 20 and the nested tube 18 of the clamp 12 to enable the clamp 12 to be received within the slot 74 as depicted in FIG. 10, e.g. with the clamp 12 oriented generally perpendicularly to the slot plate 64.

The slot plate 66 includes a plurality of mounting apertures 76 configured for alignment with selected ones of the bores 58 in the mounting brackets 54. The mounting apertures 76 may take any form or arrangement, but as depicted in FIG. 10, in one embodiment the mounting apertures 76 comprise pairs or multiples of overlapping polygon-shaped apertures, such as square- or diamond-shaped apertures arranged in a vertically stacked arrangement with adjacent corners of the polygons overlapping to form a continuous aperture. This arrangement enables a round or square shafted fastener to be inserted through the mounting aperture 76 and to be at least partially vertically moveable within the mounting aperture 76. The fastener may include a shaft with dimensions smaller than that of the polygons forming the mounting aperture 76 to enable at least partial movement within the mounting aperture 76. Or the shaft may have dimensions corresponding with the polygonal shape; overlapping of the polygonal shapes provides positions for the fastener that are closer together than would be possible with separated apertures. For example, each polygon of the mounting aperture 76 may be sized and shaped to fixedly receive the square shoulder of a carriage bolt 60 while the round shaft of the carriage bolt 60 may have a diameter which allows the bolt to be slid between mounting positions along the aperture 76 without complete removal of the bolt 60 from the aperture 76.

Indentations 78 into the mounting apertures 76 provided by the overlapping square or diamond shape allows the vertical adjustability but eliminates the risk of the fastener sliding a large vertical distance within the mounting aperture 76 as may result with the use of a vertical slot. The vertical adjustability provided by the mounting apertures 76 also enables a greater ability to fine tune the vertical adjustment while also providing fewer mounting apertures 76.

Conversely, known methods in the art provide a large plurality of apertures in the both the slot plate 66 and the mounting bracket 54 which can be selectively aligned in hopes of achieving a desired vertical adjustment. Such methods may reduce the strength of the slot plate 66 and/or mounting bracket 54 due to the large number of holes therethrough, may be unsightly, and may still not provide a desired alignment. The slot 64 in the base plate 52 also increases the vertical adjustability of the slot plate 66 by allowing the slot plate 66 to be adjusted vertically downward into the base plate 52.

The latch plate 68, release lever 70, and locking lever 72 are each pivotably coupled to the slot plate 66 along a common side thereof. The latch plate 68 is pivotable about an axis formed by a fastener 80 coupling the latch plate 68 to the slot plate 66. Pivotal movement of the latch plate 68 moves an arm 82 extending from the latch plate 68 between an overlapping and non-overlapping relationship with the slot 74 in the slot plate 66. The latch plate 68 and the arm 82 form a generally arcuate surface configured to engage around the clamp 12 in a generally form fitting manner when the clamp 12 is fully inserted into the slot 74. A generally circular opening is thus formed by the forward end of the slot 74 and the latch plate 68 in which the clamp 12 may be captured.

The release lever 70 is pivotable about an axis formed by a fastener 86 coupling the release lever 70 to the slot plate 66. The release lever 70 is a generally elongate member that extends forward away from the fastener 86 a distance before turning vertically upward and then outwardly away from the plane of the slot plate 66 to form a release pedal 88 that lies in a plane generally parallel to the base plate 52. As depicted in FIG. 4, the release lever 70 and the latch plate 68 may each include a respective pin 87 which extend into respective arcuate apertures 89 in the slot plate 66. The pins 87 and slots 89 may define a range of pivotal motion of the release lever 70 and the latch plate 68.

The locking lever 72 lies vertically above the release lever 70 and is pivotable about an axis formed by a fastener 90. The locking lever 72 is a generally elongate member that extends rearward from the fastener 90 toward and into abutting contact with the latch plate 68. The locking lever 72 also extends forward from the fastener 90 a distance before turning outward and away from the plane of the slot plate 66 to form an unlocking pedal 92. A top surface of the unlocking pedal 92 may be positioned substantially vertically even with a top surface of the release pedal 88 and is spaced a distance rearward of the release pedal 88.

Figure 6:
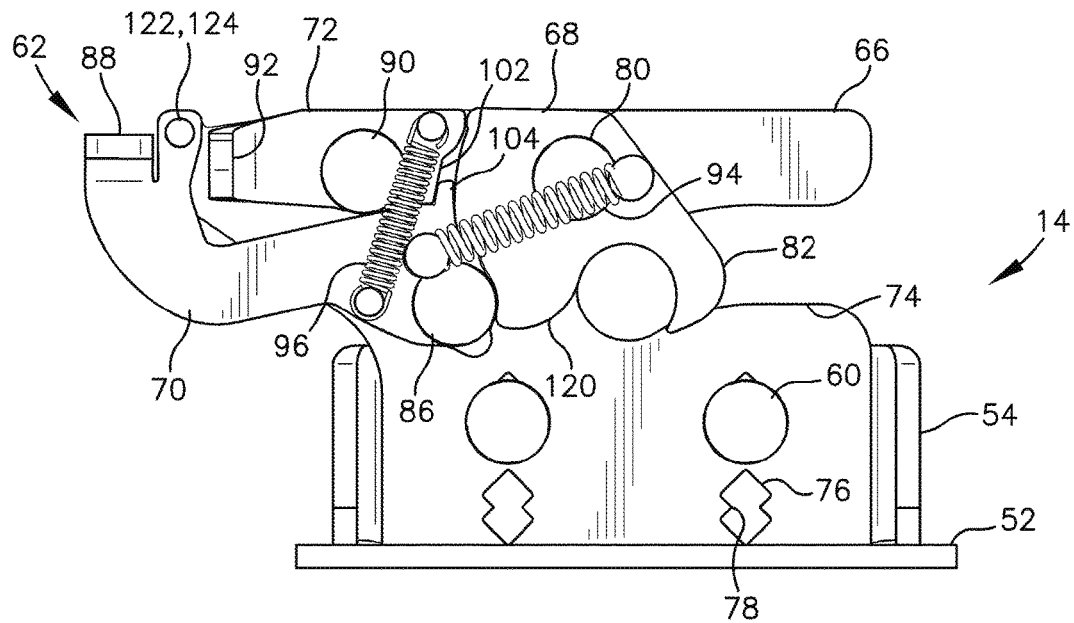
FIG. 6 is an outer side elevational view of the locking mechanism of FIG. 4 in a locked orientation.
Figure 7:
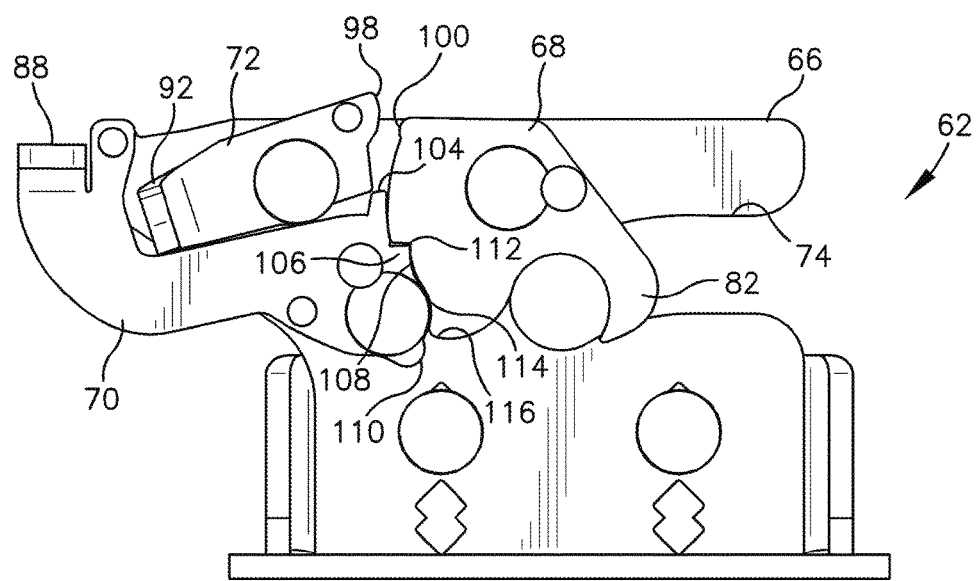
FIG. 7 is an outer side elevational view of the locking mechanism of FIG. 6 in an unlocked orientation and depicted with a pair of coil springs removed for clarity.

A first extension spring 94 is coupled between the latch plate 68 and the release lever 70. The spring 94 is coupled to the latch plate at a location that provides an over-center condition that biases the latch plate 68 toward either an open position (FIG. 9) or a closed position (FIGS. 6-8). A second extension spring 96 is disposed between the release lever 70 and the locking lever 72 to bias the locking lever 72 toward clockwise rotation. The springs 94 and 96 are not shown in FIGS. 7-9 so as not to obstruct the view of the latch plate 68, release lever 70, and locking lever 72.

Interaction of the latch plate 68, release lever 70, and locking lever 72 is now described with reference to FIGS. 6-9 in which FIG. 6 depicts a locked orientation of the latch assembly 62, FIG. 7 depicts an unlocked orientation, FIG. 8 depicts an unlatched orientation, and FIG. 9 depicts a released or armed orientation. The locking lever 72 is pivotable from a substantially horizontal position (shown in FIG. 6) to an angled position in which it is moved counter-clockwise about the fastener 90 to raise a rearward end thereof (shown in FIGS. 7-9). A rearward edge of the locking lever 72 includes an abutment 98 that, when in the horizontal position, aligns with and/or contacts a stop 100 protruding from a front edge of the latch plate 68. Thereby, the locking lever 72 resists counter-clockwise movement of the latch plate 68.

The rearward edge of the locking lever 72 also forms a recess 102 between the locking lever 72 and the forward edge of the latch plate 68 that is sized to accommodate a tooth 104 on the release lever 70. In the horizontal position, the locking lever 72 obstructs movement of tooth 104 and thus the release lever 70 in the counter-clockwise direction. In the angled position, the bottom surface of the locking lever 72 is moved upward a distance just greater than the height of the tooth 104 to allow the tooth 104 to move beneath and along the bottom surface of the locking lever 72.

The release lever 70 is pivotable between several positions. In a first position shown in FIGS. 6 and 7, the release lever 70 obstructs pivotal movements of the latch plate 68 through abutting contact between a rearward edge of the release lever 70 and a forward edge of the latch plate 68. The rearward edge of the release lever 70 extends downward from the tooth 104 and turns sharply rearward to form a ridge 106 followed by a downwardly extending, curvilinear, sliding surface 108 before ending with a rearwardly extending bump 110.

Similarly, the forward edge of the latch plate 96 extends downwardly from the stop 100 and follows the contours of the release lever 70 to form a rearwardly receding recess 112 in which the ridge 106 is receivable and a second sliding surface 114 that abuts the sliding surface 108 before turning rearward just before reaching the bump 110 to form a point 116. Engagement of the ridge 106 on the release lever 70 with the recess 112 in the latch plate 68 prevents counter-clockwise rotation of the latch plate 68 and abutment of the sliding surfaces 108 and 114 prevents clockwise rotation of the latch plate 68.

Pivoting of the release lever 70 in the counter-clockwise direction (following movement of the locking lever 72 to the unlocked position) first withdraws the ridge 106 from the recess 112 in the latch plate 68, as depicted in FIG. 8. The latch plate 68 is now able to rotate counter-clockwise, for example, when a rearwardly directed force is applied by the clamp 12 on the arm 82. Further rotation of the release lever 70 in the counter-clockwise direction brings the bump 110 into contact with the point 116 on the latch plate 68. The bump 110 may function as a cam surface along which the point 116 follows to cause the latch plate 68 to at least partially rotate in the counter-clockwise direction.

In one embodiment, this partial rotation is sufficient to overcome the over-center condition of the latch plate 68 and the coil spring 94 and allow the bias of the coil spring 94 to rotate the latch plate 68 to a position depicted in FIG. 9. In another embodiment, the partial rotation is sufficient to move the latch plate 68 in the counter-clockwise direction a distance such that the ridge 106 of the release lever 70 is unable to re-engage the recess 112 when the release lever 70 is rotated in the reverse or clockwise direction by the spring 96. The ridge 106 thus comes into contact with an upper sliding surface 118 of the latch plate 68 and the latch plate 68 is placed in an unlatched orientation. The unlatched orientation may also be achieved by the clamp 12 transmitting a force provided by the compressed motorcycle suspension to the latch plate 68 that at least partially rotates latch plate 68 in the counter-clockwise direction.

In the unlatched orientation, the arm 82 of the latch plate 68 at least partially obstructs the slot 74 in the slot plate 66. And the ridge 106 of the release lever 70 slides along the upper sliding surface 118 of the latch plate 68 as the latch plate 68 is rotated in the counter-clockwise direction toward the released position depicted in FIG. 9. Upon full rotation of the latch plate 68 to the released orientation, the arm 82 is fully removed from obstruction of the slot 74 and the ridge 106 of the release lever 70 contacts the stop 100 on the latch plate 68 to resist further counter-clockwise rotation of the latch plate 68. In the released orientation the clamp 12 may be fully removed from the slot 74.

Although referred to as the released orientation, the orientation depicted in FIG. 9 may also be referred to as an armed orientation when describing engagement of the clamp 12 with the latch assembly 62. The latch plate 68 includes a cam 120 that is moved at least partially into the slot 74 when in the armed (released) orientation. Engagement of the clamp 12 with the slot 74 and movement of the clamp 12 along the slot 74 toward the forward end of the slot 74 contacts the cam 120 and rotates the latch plate 68 in the clockwise direction to reverse the process described above and return the latch plate 68, release lever 70, and locking lever 72 to the locked orientation depicted in FIG. 6.

Operation of the motorcycle tie-down apparatus 10 is now described in accordance with an embodiment of the invention. The base assembly 14 is installed on the loading surface of the transport vehicle or trailer and the clamp 12 is coupled to the frame of the motorcycle as described previously above. Each of the latch assemblies 62 are placed in the armed orientations as depicted in FIG. 9. The motorcycle is aligned perpendicular to the length of base plate 52 such that the motorcycle can be driven or manually walked or pushed across the base plate 52 between the mounting brackets 54 in a forward direction relative to FIGS. 6-9. The motorcycle is moved over the base plate 52 until the clamp 12 meets the slot plates 66 on each end of the base assembly 14.

The clamp 12, e.g. the end portion 20 of the receiving tube 16 and the nested tube 18 are aligned with the slots 74 in a respective one of the slot plates 66. In one embodiment, a rider sits on the motorcycle to at least partially compress the suspension thereof and to thereby lower the clamp 12 for alignment with the slots 74. As discussed previously above, the slot plate 66 may be vertically adjusted during installation on the mounting brackets 54 using the mounting apertures 76 to relatively precisely align the slots 74 with the position of the clamp 12 when the rider is seated on the motorcycle.

Upon engagement of the clamp 12 with both slots 74, the motorcycle is moved further forward to translationally move the clamp 12 along the slots 74. Near the forward end of the slots 74 the clamp 12 is drawn vertically downward by the path of the slots 74 and thus the suspension of the motorcycle is further compressed. Compression of the suspension of the motorcycle by the rider's weight and additionally by the downward sloping path of the slots 74 may aid to provide a tight and secure coupling between the base assembly 14 and the clamp 12 and between the clamp 12 and the motorcycle. Movement of the clamp 12 forward along the slots 74 also engages the cam 120 on the latch plate 68 to move the latch assembly 62 from the armed orientation to the locked orientation as depicted in FIG. 10. The motorcycle is thus secured against movements and forces encountered during transportation.

The apparatus 10 may be locked to prevent theft or removal of the motorcycle from the apparatus 10. The slot plate 66 and the release lever 70 may include bores 122 and 124 that are aligned when the latch assembly 62 is in the locked orientation. A padlock, pin, rod, strap, or similar element may be installed through the bores 122, 124 to prevent movement of the latch assembly 62 to the released orientation.

To disengage the clamp 12 from the base assembly 14 and remove the motorcycle from the transport vehicle, a dual-motion action is performed on the locking lever 72 and the release lever 70 of each latch assembly 62 such as by a foot of a rider. As depicted in FIG. 7, the unlocking pedal 92 of the locking lever 72 is first moved vertically downward below the height of the top surface of the release pedal 88 of the release lever 70. Once the tooth 104 of the release lever 70 is freed from the recess 102, the release pedal 88 is moved vertically downward a greater vertical distance that the unlocking pedal 92 to release the latch plate 68 and allow the clamp 12 to be withdrawn from the slot 74.

The dual-motion action of the latch assembly 62 prevents inadvertent release of the clamp 12 from the base assembly 14 such as when an object is dropped on the unlocking pedal 92 and/or the release pedal 88 or when a rider unintentionally steps on the pedals 88, 92. Simply stepping on both pedals 88, 92 at the same time will not operate the latch assembly 62 to release the clamp 12.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A tie-down apparatus for transporting a vehicle having a pair of frame members extending along the length of the vehicle and exposed near a bottom surface of the vehicle, the apparatus comprising:
    a clamp that is engageable with the frame members and that includes an elongate end that extends laterally away from the frame members; and
    a latch assembly configured to capture the end of the clamp,
    the latch assembly including
        a slot plate including a slot extending into a body of the slot plate from a first edge thereof, and
        a latch plate, a release lever, and a locking lever that are each pivotably coupled to the slot plate
    the latch assembly being moveable between a locked orientation, an unlocked orientation, and a released orientation,
        in the locked orientation the latch plate extending across the slot to capture the end of the clamp between a closed end of the slot and the latch plate, the release lever abutting the latch plate and preventing pivotal movement of the latch plate, and the locking lever obstructing pivotal movement of the release lever,
        in the unlocked orientation, the locking lever being pivoted and enabling pivotal movement of the release lever and the release lever being pivoted away from abutment with the latch plate and enabling pivotable movement of the latch plate, and
        in the released orientation the latch plate being pivoted away from obstruction of the slot and enabling removal of the end of the clamp from the slot.

2. The tie-down apparatus of claim 1, wherein at least a portion of the slot extends at a downward angle.

3. The tie-down apparatus of claim 2, wherein engagement of the end of the clamp with the portion of the slot extending at the downward angle draws the clamp and vehicle vertically downward and at least partially compresses a suspension of the vehicle.

4. The tie-down apparatus of claim 1, wherein the release lever forms a release pedal and the locking lever forms an unlocking pedal, the release pedal and the unlocking pedal being engageable by a foot of a user to pivot the release lever and the locking lever respectively.

5. The tie-down apparatus of claim 4, wherein movement of the latch assembly from the locked orientation to the released orientation requires the locking lever to be pivoted by moving the unlocking pedal to a position vertically below a top surface of the release pedal before the release pedal can be moved vertically downward to pivot the release lever.

6. The tie-down apparatus of claim 1, further comprising:
a base plate that is coupleable to a transport vehicle;
a mounting bracket disposed on the base plate and extending substantially vertically upward, the slot plate being coupled to the mounting bracket, the slot plate including a mounting aperture having a perimeter formed from an outline of a plurality of vertically stacked polygons positioned to overlap at adjacent corners thereof.

7. The tie-down apparatus of claim 1, wherein the latch plate includes an arm extending therefrom that is configured to extend across the slot when in the locked orientation, the arm having a contoured portion configured to abut a portion of an exterior surface of the clamp in a substantially form fitting manner.

8. The tie-down apparatus of claim 1, wherein the latch plate includes a recess and an upper sliding surface adjacent to the recess, the release lever includes a ridge configured to engage the recess in the locked orientation, and the ridge contacting and sliding along the upper sliding surface in the unlocked orientation.

9. The tie-down apparatus of claim 1, wherein the latch plate includes a sliding surface that abuts a mating surface of the release lever in the locked orientation, the sliding surface including a point at a lower end thereof, the mating surface including a bump positioned below the point and protruding at least partially toward the latch plate when in the locked orientation, and wherein the release lever is pivoted from the locked orientation to the unlocked orientation and the bump contacts the point to at least partially pivot the latch plate toward the released orientation.

10. The tie-down apparatus of claim 1, wherein the release lever includes a tooth that is disposed between the latch plate and the locking lever in the locked orientation, interaction between the tooth and the locking lever preventing pivotal movement of the release lever.

11. The tie-down apparatus of claim 1, wherein the clamp further comprises:
a receiving tube having a first clamp arm disposed on an exterior surface;
a nested tube slideably disposed at least partially within the receiving tube and a second clamp arm disposed on the exterior surface of the nested tube, the first and second clamp arms each being configured to engage a respective one of the frame members of the vehicle; and
a guide that resists rotational movement of the receiving tube relative to the nested tube, the guide including a flange with an aperture extending therethrough disposed on an exterior surface of one of the receiving tube and the nested tube and a guide rod coupled to the other of the receiving tube and the nested tube, the guide rod being slideably disposed in the aperture.

12. A tie-down apparatus for transporting a vehicle having a pair of frame members extending along the length of the vehicle and exposed near a bottom surface of the vehicle, the apparatus comprising:
a clamp that is engageable with the frame members and that includes an elongate end that extends outwardly away from the frame members; and
a latch assembly configured to releasably capture the end of the clamp to secure the vehicle to a transport vehicle, the latch assembly including
a slot plate extending vertically upward from a base and including a slot extending into a body of the slot plate from an edge thereof, at least a portion of the slot extending downward,
a latch plate pivotably coupled to the slot plate and including an arm and a first engagement face, the latch plate being pivotable to extend the arm across the slot,
a release lever pivotably coupled to the slot plate and including a second engagement face configured to mate with the first engagement face to prevent pivotable movement of the latch plate,
a locking lever pivotably coupled to the slot plate and including an abutment that contacts the latch plate and prevents pivotable movement of the latch plate, the locking lever being pivotable into contact with the release lever to prevent pivotable movement of the release lever.

13. The tie-down apparatus of claim 12, wherein the locking lever includes a first distal end and the release lever includes a second distal end, and wherein the first distal end of the locking lever must be moved vertically downward to a position below a top surface of the second distal end of the release lever before the second distal end can be moved vertically downward to pivot the release lever and move the second engagement face away from the first engagement face of the latch plate.

14. The tie-down apparatus of claim 12, wherein the first engagement face of the latch plate includes a recess and the second engagement face of the release lever includes a ridge configured to engage the recess and obstruct pivotal movement of the latch plate.

15. The tie-down apparatus of claim 12, wherein the clamp is engaged with the frame members and the end of the clamp is engaged in the portion of the slot that extends downward, and wherein a suspension of the vehicle is at least partially compressed.

16. The tie-down apparatus of claim 15, wherein engagement of the end of the clamp with the slot requires the suspension of the vehicle to be at least partially pre-compressed to move the end of the clamp downward into vertical alignment with the slot.

17. A tie-down apparatus for transporting a vehicle having a pair of frame members extending along the length of the vehicle and exposed near a bottom surface of the vehicle, the apparatus comprising:
a clamp that is engageable with the frame members and that includes a first end and an opposite second end, the first and second ends extending outwardly from respective sides of the vehicle; and
a base assembly including a pair of latch assemblies disposed at opposite ends of a base plate, the latch assemblies being spaced apart a distance sufficient to receive at least a portion of the vehicle therebetween, the latch assemblies configured to releasably capture a respective one of the first and the second ends of the clamp to secure the vehicle to a transport vehicle, each latch assembly including a slot plate extending vertically upward from the base plate and including a slot extending into a body of the slot plate from an edge, at least a portion of the slot extending downward toward the base plate, a latch plate pivotably coupled to the slot plate and including an arm and a first engagement face, the latch plate being pivotable to extend the arm across the slot, a release lever pivotably coupled to the slot plate and including a second engagement face configured to mate with the first engagement face to prevent pivotable movement of the latch plate, and including a tooth extending from the perimeter of the release lever, and a locking lever pivotably coupled to the slot plate and being selectively pivotable into contact with the tooth of the release lever to prevent pivotable movement of the release lever.

18. The tie-down apparatus of claim 17, wherein the slot plate lies in a first vertical plane, the locking lever and the release lever lie in a second plane that is parallel to the first plane, and wherein the locking lever includes a distal end that extends out of the second plane in a direction away from the first plane to form an unlocking pedal, and the release lever includes a distal end that extends out of the second plane in a direction away from the first plane to form a release pedal, the unlocking pedal and the release pedal being engageable by a foot of a user to pivot the locking lever and the release lever respectively.

19. The tie-down apparatus of claim 18, wherein the locking lever must be pivoted by moving the unlocking pedal to a position vertically below a top surface of the release pedal before the release pedal can be moved vertically downward to pivot the release lever.

20. The tie-down apparatus of claim 17, wherein the base assembly is fixedly coupled to a loading surface of one of a truck and a trailer, and the vehicle comprises one of a two-wheeled motorcycle, a three-wheeled motorcycle, and a four-wheeled all-terrain vehicle.

\* \* \* \* \*